(12) United States Patent
Novak et al.

(10) Patent No.: US 8,554,378 B2
(45) Date of Patent: Oct. 8, 2013

(54) SYSTEM FOR CONTROL OF MOBILE HYDRAULIC EQUIPMENT

(75) Inventors: Eugene Novak, Mars, PA (US); Eric J. Zacherl, Zelienople, PA (US)

(73) Assignee: Magnetek, Inc., Menomonee Falls, WI (US)

( * ) Notice: Subject to any disclaimer, the term of this patent is extended or adjusted under 35 U.S.C. 154(b) by 202 days.

(21) Appl. No.: 13/042,584

(22) Filed: Mar. 8, 2011

(65) Prior Publication Data

US 2012/0232704 A1    Sep. 13, 2012

(51) Int. Cl.
*G05D 7/00* (2006.01)

(52) U.S. Cl.
USPC ............... 700/282; 700/65; 700/83; 700/299

(58) Field of Classification Search
USPC ............................ 700/65, 83, 275, 282, 299
See application file for complete search history.

(56) References Cited

U.S. PATENT DOCUMENTS

| 5,453,758 | A  | * | 9/1995  | Sato ........................... 345/158 |
| 6,493,616 | B1 | * | 12/2002 | Rossow et al. ................. 701/50 |
| 7,844,379 | B2 |   | 11/2010 | Tang et al. |
| 2003/0147727 | A1 |   | 8/2003 | Fujishima et al. |
| 2008/0288129 | A1 |   | 11/2008 | Hancock, Sr. |

OTHER PUBLICATIONS

"NEXSTAR—The next level of proportional crane load control is now a reality", Auto Crane, Tulsa, OK; Oct. 2009.
Notification of Transmittal of the International Search Report and the Written Opinion of the International Searching Authority, or the Declaration; International Application No. PCT/US2012/026909; Filed Feb. 28, 2012—(9) Pages.

* cited by examiner

*Primary Examiner* — Carlos Ortiz Rodriguez
(74) *Attorney, Agent, or Firm* — Boyle Fredrickson, S.C.

(57) ABSTRACT

A controller for mobile hydraulic equipment includes a radio receiver, hydraulic controller, and display unit. The controller further includes terminals configurable to function as a combination of analog or digital inputs or outputs according to the system requirements. A user interface included on the controller permits an operator to select a desired function for each terminal and to configure the controller according to the application requirements.

16 Claims, 3 Drawing Sheets

100
- DEVICE CONFIG
  - RF CHANNEL
  - ACCESS CODE
  - PASSWORD ENABLE
  - TIME/DATE
  - RF ANTENNA
  - SET DEFAULT VALUES
- IO CONFIG
  - I/O TYPE
  - MIN/MAX CURRENT
  - RAMPING
  - MIN/MAX DUTY CYCLE
  - PWM FREQUENCY
- CAN CONFIG
  - NUMBER
  - BAUD RATE
  - CAN SETTINGS
- UNIT STATUS
  - ACCESS CODE
  - TX ID
  - CHANNEL
  - TIME/DATE
  - TEMP
- PASSWORD ENABLE
- SAVE AND EXIT
- EXIT WITHOUT SAVE

FIG. 5

SYSTEM FOR CONTROL OF MOBILE HYDRAULIC EQUIPMENT

BACKGROUND OF THE INVENTION

The subject matter disclosed herein relates to a controller for mobile hydraulic equipment. More specifically, the subject matter disclosed herein relates to an integrated radio receiver, hydraulic controller, and user interface with enhanced control.

Mobile hydraulic equipment, such as a boom and outriggers, may be mounted to or integrally assembled onto a vehicle frame to provide a mobile crane. The mobile crane may then be driven to locations, such as construction sites, where heavy objects need to be moved. The components of the crane are often driven by hydraulic motors or pistons. The hydraulic system may, for example, raise and lower, extend and retract, or rotate the boom during a lift. The hydraulic system may additionally be required to extend and retract or raise and lower outriggers used to stabilize the vehicle. Further, a hydraulic motor may drive a winch used to raise and lower the hook during a lift.

Each of the motions of the mobile crane may require different methods of control from the hydraulic system. Some of the motions may require, for example, a binary on/off signal while other motions may require variable flow control. A hydraulic valve can be controlled by an electronic solenoid either to supply hydraulic fluid to a component or to cause the hydraulic fluid to return to a reservoir. Further, the rate at which the fluid is supplied may affect the speed at which the component moves. In one mode of operation, the solenoids may be selectively turned fully on or off to open or close the valve. Alternately, the solenoids may be modulated on and off at a duty cycle to partially open a valve, controlling the rate at which the hydraulic fluid flows through the valve.

Historically, the control of the hydraulic system has utilized a valve block and a hydraulic controller to control each of the components of the mobile crane. The hydraulic controller receives command signals either via separate electrical conductors or, optionally, via an industrial network from a control device. The hydraulic controller converts the command signals to control signals for each solenoid to control individual valves on the valve block.

The control device receives commands from an operator to select desired motions of the mobile crane. The control device may include pushbuttons, toggle switches, selector switches, levers, joysticks, or a combination thereof, with which the operator may identify a desired motion and a desired speed of that motion. Typically the control device is a wireless device which allows the operator to be positioned in proximity to or in view of the lift or other commanded motion. The wireless control device necessarily includes a transmitter, and a receiver is mounted on the vehicle to receive the command signals from the transmitter. The receiver passes the command signals from the transmitter to the hydraulic controller via either discrete wiring or via an industrial network.

In addition, it is often desirable to provide the operator with a visual indication of the performance of the control system. Consequently, a human-machine interface (HMI) may also be included in the system. The HMI is connected to the industrial network and monitors the commands between the receiver and the hydraulic controller. The HMI may be configured to provide indicators of operation such as which motion is active, the speed at which the motion is occurring, or fault conditions in the system.

This method of controlling a mobile crane has not been met without various drawbacks. Each of the components of the control system, i.e. the hydraulic controller, receiver, and HMI, are typically provided by separate vendors. Although each component may be ordered to meet a desired specification, the manufacturer of the mobile crane must manage integration of each of the components. Further, different models and sizes of cranes may require different configurations for one or more of the components. Consequently, the mobile crane manufacturer may need to stock many different models or configurations of each component. Further, replacing certain members in the hydraulic system, such as a piston, may require adjustment to the control of the valve supplying hydraulic fluid to the piston, which, in turn, requires recalibration of the control system.

Thus, it would be desirable to provide a controller which integrates many of the control components, reducing the space required for multiple components. Further, it would be desirable for the controller to be configurable for different applications, reducing the number and variety of components required.

Another drawback of hydraulically operated mobile cranes is that the same crane may often be required to operate in significantly variable environments. The crane may, for example, work outside or be driven inside a warehouse or manufacturing facility. Further, environmental conditions in an outdoor environment may vary dramatically as the weather or seasons change. Significant changes in temperature may cause the viscosity of the hydraulic fluid to change, affecting its flow rate and the performance of the mobile crane.

Thus, it would also be desirable to compensate control of the hydraulic valves according to the temperature of the environment in which the crane is operating.

BRIEF DESCRIPTION OF THE INVENTION

The subject matter disclosed herein describes a controller for mobile hydraulic equipment including a radio receiver, hydraulic controller, and display unit. The controller further includes terminals configurable to function as a combination of analog or digital inputs or outputs according to the system requirements. A user interface included on the controller permits an operator to select a desired function for each terminal and to configure the controller according to the application requirements.

According to a first embodiment of the invention, a controller for mobile hydraulic equipment includes a housing and a receiver mounted at least partly within the housing. The receiver is configured to wirelessly receive a plurality of transmitted control signals. A processor mounted within the housing is operatively connected to the receiver to receive the control signals and generate a plurality of output signals for operating the mobile hydraulic equipment. A memory device mounted within the housing is operatively connected to the processor and stores at least one parameter corresponding to control of the mobile hydraulic equipment. A display mounted to the housing is operatively connected to the processor. The display is configured to provide a visual indication to an operator of at least one parameter corresponding to control of the mobile hydraulic equipment. A user interface is mounted to the housing and configured to receive input from the operator to adjust the parameter on the display.

As another aspect of the invention, a plurality of terminals is operatively connected to the processor and selectively configured to operate in one of a plurality of modes. The memory device stores at least one parameter corresponding to each terminal, and the parameter is adjustable from the user interface to select the operating mode.

Thus, it is a feature of this invention that a single controller integrates many of the control components for mobile hydraulic equipment and provides flexibility to configure the controller according to the requirements of different applications.

As yet another aspect of the invention, a portion of the terminals may be selectively operable in a first mode to receive an analog signal or a second mode to receive a digital signal. A portion of the terminals may also be selectively operable in a first mode to receive an input signal and selectively operable in a second mode to transmit an output signal. In the first mode, the terminals may be selectively operable to receive one of a digital input and a frequency input and, in the second mode, to output one of a current compensated output, a pulse width modulated output, and a digital output. A portion of the terminals may be configured as paired outputs such that only one of the paired outputs may output a signal at a time.

According to still other aspects of the invention, the user interface may be a plurality of buttons accessible to the operator through at least one opening in the housing. A temperature sensor may provide a signal to the processor corresponding to an ambient temperature at the controller, and a portion of the terminals may be configured to provide an output signal compensated as a function of the ambient temperature.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 5 illustrates one embodiment of a menu tree of parameters for the controller of FIG. 1

Figure 1:
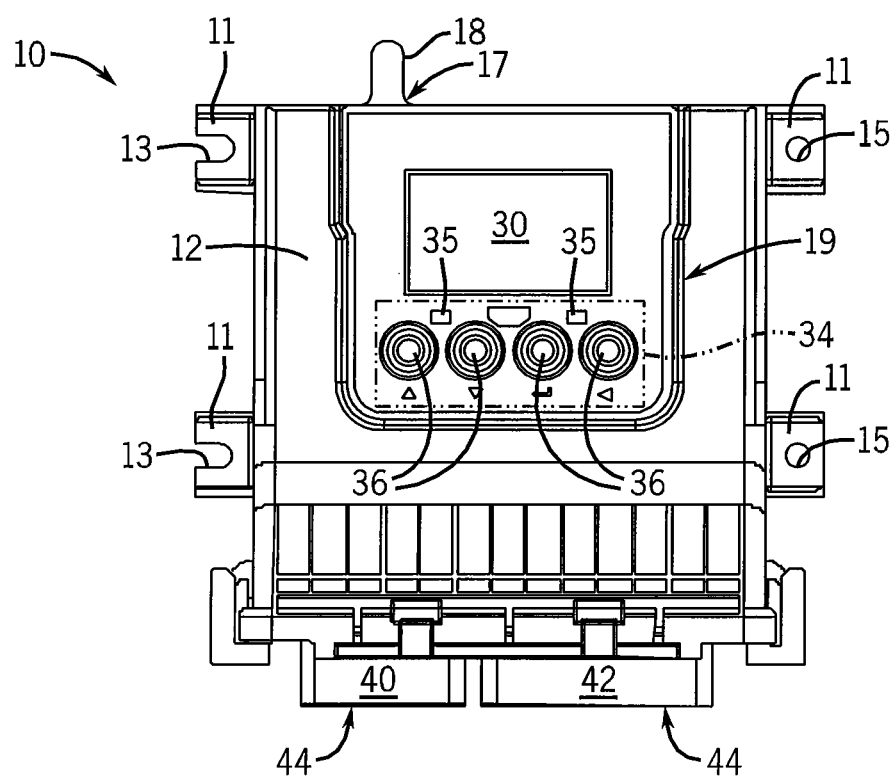
FIG. 1 is a front elevation view of a controller according to one embodiment of the invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Referring initially to FIG. 1, a controller 10 for mobile hydraulic equipment includes a housing 12 having mounting feet 11 extending outwards from a rear surface of the housing 12. The mounting feet 11 have a slot 13 or an opening 15 configured to receive a fastener, not shown, to secure the housing 12 to a mounting surface. The mounting surface may be any surface on the vehicle to which the mobile hydraulic equipment is mounted or, optionally, the housing 12 may be mounted within a separate enclosure, not shown, which is, in turn mounted to the vehicle. A top surface of the housing 12 includes an opening 17 through which an antenna 18, or a portion thereof is connected. If the housing 12 is mounted within a separate enclosure, an external antenna, not shown, may be mounted to the enclosure and an electrical conductor may be connected in series between the external antenna and a connector extending through the opening 17.

The housing 12 includes at least one opening 19 on a front surface through which a display 30 and a user interface 34 are accessible to an operator. Optionally, multiple openings 19 may be provided, including separate openings for the display 30 and the user interface 34 or for components of the user interface 34. The display 30 provides, for example, graphical as well as alpha-numeric indication of the status of the controller 10, including, but not limited to, parameter values, configuration of the controller 10, battery life, strength of the signal being received, magnitudes of input/output signals, and warning or fault messages.

The user interface 34 is configured to receive input from the operator. According to one embodiment of the invention, the user interface 34 includes four push buttons 36. The push buttons 36 allow the operator to scroll up or down, enter data, or return to a previous entry. Optionally, any suitable number of buttons 36 or other input devices may be provided in the user interface 34 according to the system requirements. The user interface 34 also includes a pair of light-emitting diodes (LEDs) 35 which provide a visual indication of whether a fault exists, whether the controller 10 is powered up, and whether the controller 10 is communicating with a transmitter.

Figure 2:
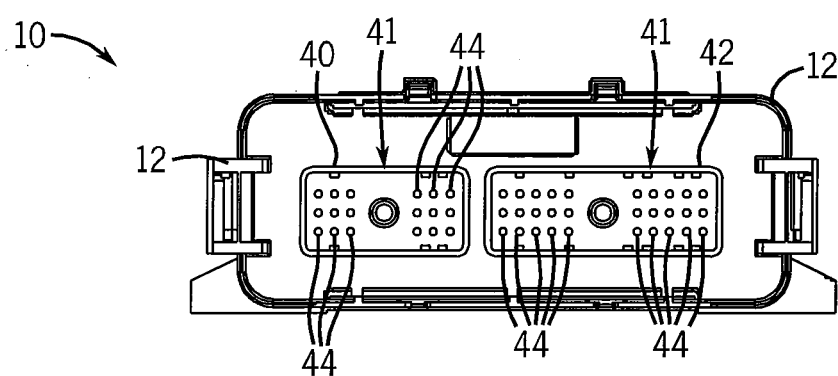
FIG. 2 is a bottom plan view of the controller of FIG. 1.

Referring also to FIG. 2, the housing 12 includes two openings 41 through which connectors for input and output terminals 44 extend. As illustrated, a first connector 40 extends through one of the two openings 41 and a second connector 42 extends through the other of the two openings 41. Optionally, the housing 12 may include either a single opening 41 or more than two openings 41 for terminals 44 according to the application requirements. The terminals 44 provide a connection to the inputs and outputs, a portion of which are configurable.

Figure 3:
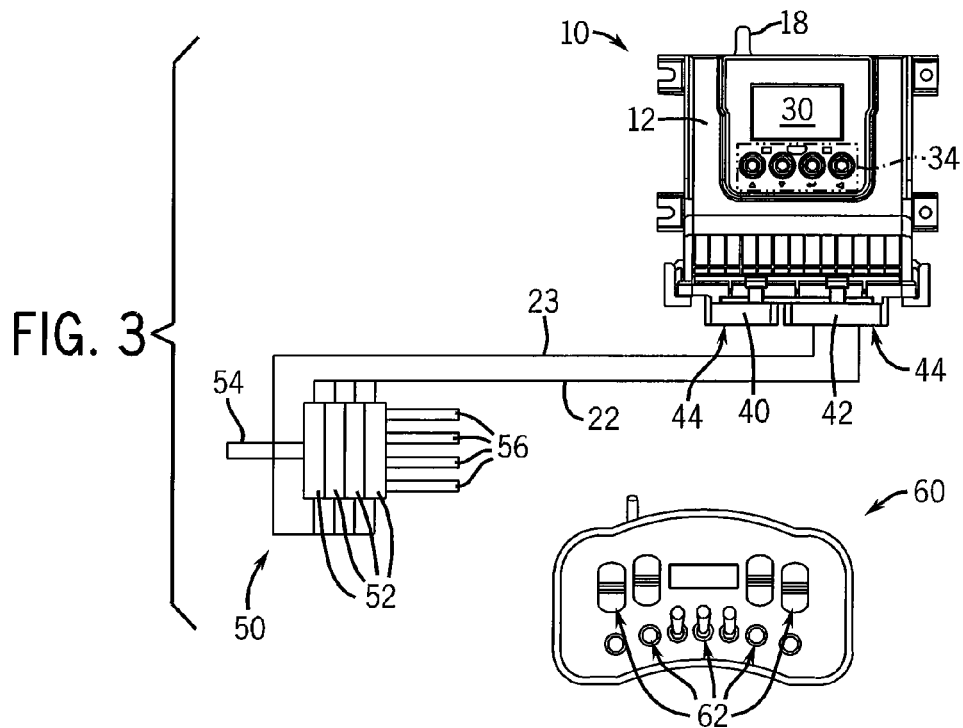
FIG. 3 is a schematic representation of an exemplary environment incorporating the controller of FIG. 1.

Referring next to FIG. 3, an exemplary application of the controller 10 includes a hydraulic valve block 50 connected to the controller 10. The hydraulic valve block 50 controls distribution of hydraulic fluid to the various hydraulic motors, pumps, and pistons used to move the hydraulic equipment. An input line 54 establishes fluid communication between a reservoir and the valve block 50. Valves, controlled by solenoids 52, regulate the flow of hydraulic fluid between the input line 54 and each output line 56 to the hydraulic devices. The solenoids 52 receive control signals via electrical conductors 22 connected between the terminals 44 of the controller 10 and each solenoid 52. The conductors 22 may be separate conductors for each solenoid 52, an industrial network medium, or any other suitable conductor 22. A return conductor 23 may be included from each solenoid 52 to the controller 10. The return conductor 23 may carry signals indicating, for example, the status of a valve or the magnitude of a current flowing through a solenoid. A transmitter 60 is configured to accept commands from an operator via input devices 62 and transmit control signals responsive to the commands wirelessly to the receiver.

Figure 4:
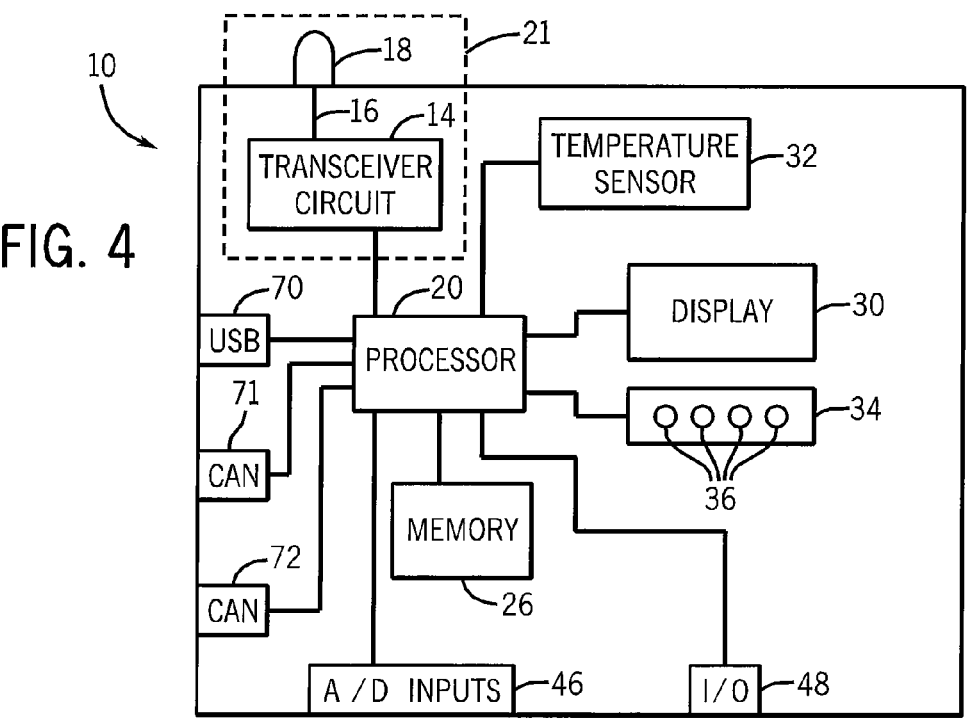
FIG. 4 is a block diagram representation of the controller of FIG. 1.

Referring next to FIG. 4, the controller 10 incorporates a receiver 21, the display 30 and user interface 34, along with a processor 20 to control hydraulic equipment. The receiver 21 includes the antenna 18 and a receiver circuit. According to one embodiment, it may be desirable for the controller to transmit, for example, a watchdog signal or a status signal to the transmitter circuit. Consequently, the receiver circuit may be integrated into a transceiver circuit 14. Optionally, separate transmit and receive circuits may be provided. An electrical conductor 16 connects the antenna 18 to the transceiver circuit 14. The transceiver circuit 14 communicates command signals received at the controller 10 to the processor 20.

The processor 20 is operatively connected to the memory device 26. The processor 20 may include a single processor or multiple processors operating independently or in parallel and connected in any manner known in the art. Similarly, the memory device 26 may include either a single device or multiple devices. Multiple devices may be interconnected via a bus or separately addressed as is known in the art. The memory device 26 stores the program, which consists of a series of processor executable instructions. The processor 20 executes the instructions to control the mobile hydraulic equipment. The memory device 26 also stores parameters used to configure the controller 10. The processor 20 reads the values of stored parameters for use during execution of the program.

The processor 20 is operatively connected to the display 30 and the user interface 34 for configuration of the controller 10. Referring also to FIG. 5, the parameters may be arranged in a menu tree 100. The current settings of a parameter are shown on the display 30, and an operator presses the push buttons 36 to scroll up or down, enter data, or return to a previous entry. Optionally, configuration of the terminals 44 may be performed via a remote device, such as a computer connected through one of the communications ports, 70-72. For example, it may be desirable to perform an initial configuration by connecting a computer to the USB port 70. A program executing on the computer may be used to transfer settings for each of the parameters in the controller 10 configuring each of the terminals 44.

In operation, the controller 10 receives commands from the transmitter 60 to control the mobile hydraulic equipment. The control signals are received at the antenna 18 and converted by the transceiver circuit 14 into signals to the processor 20. The processor 20 executes the program to convert the control signals received from the transceiver circuit 14 to desired command signals for output at the terminals 44, according to the configuration of the terminals 44 defined, at least in part, by the parameter settings.

The terminals 44 may be selectively configured for one of multiple modes of operation. According to one embodiment of the invention, a first portion 46 of the terminals 44 may be configured in a first mode to receive an analog input signal and in a second mode to receive a digital input signal. A single electronic circuit accepts either the analog signal or the digital signal from the terminal 44. The electronic circuit includes an analog-to-digital converter which converts the magnitude of the voltage present at the terminal 44 to a digital value readable by the processor 20. If the terminal 44 is configured to receive an analog signal, the processor 20 executes the control program responsive to the digital value corresponding to the magnitude of the voltage present at the terminal 44. If the terminal 44 is configured to receive a digital signal, the processor 20 converts the digital value from the analog-to-digital converter to a logical "1" when the magnitude of the voltage is greater than a first threshold voltage, such as three volts, and converts the digital value to a logical "0" when the magnitude of the voltage is less than a second threshold voltage, such as two volts. Optionally, the first and second threshold values may be the same value or they may be selected at another value according to the system requirements.

A second portion 48 of the terminals 44 may be configured in a first mode to receive an input signal and in a second mode to transmit an output signal. Each terminal 44 of the second portion 48 includes parallel circuits selectively active according to the configuration of the terminal 44. One of the parallel circuits is configured to receive the input signal and the other of the parallel circuits is configured to transmit the output signal, and only one of the circuits is operatively connected to the terminal 44 at a time as selected by a configuration parameter for each terminal 44.

Each of the parallel circuits is further configured to selectively operate in multiple modes. The input circuit may be configured, for example, in a first mode to receive a digital input and in a second mode to receive a frequency input. A representative frequency input is a pulsed input, such as a pulse train output from an encoder, where the magnitude of the input signal alternates between a logical one and a logical zero. The output circuit may be configured to operate, for example, in one of three modes. First, the terminal 44 may be configured to provide a pulse-width modulated (PWM) signal. The PWM output signal alternates between zero volts and a reference voltage supplied to the terminal 44. The processor 20 executes to determine a desired duty cycle of the output signal, as a percentage of a fixed time period. The output signal remains on for the desired percentage of the period and off the remainder of the period. Second, the terminal 44 may be configured as a digital output signal. The terminal 44 operates in a similar manner to the PWM output signal with the processor 20 setting a 100 percent duty cycle to output a logical "1" and setting a zero percent duty cycle to output a logical "0". Third, the terminal 44 may be configured to provide a current compensated output signal. When a terminal 44 is configured to provide a current compensated output signal, another of the terminals 44 serves as a return terminal. A PWM signal is again output from the configurable terminal 44, and the magnitude of a current entering at the return terminal is measured. The controller 10 compares the measured current to a desired current and adjusts the duty cycle of the PWM signal responsive to a difference between the two signals.

For hydraulic control, it is often desirable to have a pair of valves and solenoids 52 for each controlled member. A first valve is controlled to supply hydraulic fluid to the member, for example, to extend the boom, and a second valve is controlled to return hydraulic fluid to the reservoir, for example, to retract the boom. Consequently, a portion of the configurable terminals 44 are configurable as paired outputs and are interlocked such that only one of the pair of terminals 44 may output a control signal at a time.

Optionally, the controller 10 may be configured to communicate via an industrial network such as the controller-area network (CAN). A first network interface 71 and a second network interface 72 are operatively connected to the processor 20. A hydraulic valve block 50 may similarly be configured to communicate via a CAN network. The processor 20 executes to encapsulate the control signals for each of the solenoids 52 into the designated network protocol or message format and transmits the control signal to the valve block 50.

The processor 20 may further execute to compensate an output signal responsive to an ambient temperature in which the controller 10 is operating. The processor 20 receives a temperature signal from a temperature sensor 32, and determines a multiplier as a function of the temperature signal. The multiplier may be calculated, read from a table of values stored in the memory device 26, or a combination thereof. The processor 20 then compensates the control signals to be output to the solenoids 52 as a function of the multiplier. The multiplier may be applied to command signal received from the transceiver circuit 14, to the duty cycle command at an output terminal 44, or an intermediate variable stored within the processor 20 and used during execution of the program. The compensated control signals are then output at the appropriate terminals 44.

It should be understood that the invention is not limited in its application to the details of construction and arrangements of the components set forth herein. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A controller configurable to operate different mobile hydraulic equipment according to requirements of different applications, the controller comprising:
a housing, wherein the housing is mounted on the mobile hydraulic equipment;
a receiver mounted at least partly within the housing and configured to wirelessly receive a plurality of transmitted control signals from a remote transmitter;
a processor mounted within the housing and operatively connected to the receiver to receive the control signals and generate a plurality of output signals for operating the mobile hydraulic equipment;
a memory device mounted within the housing and operatively connected to the processor, the memory device storing a plurality of adjustable parameters corresponding to control of the mobile hydraulic equipment;
a display mounted to the housing and operatively connected to the processor, the display configured to provide a visual indication to an operator of the plurality of adjustable parameters;
a plurality of terminals operatively connected to the processor and selectively configured to operate in one of a plurality of modes;
a user interface mounted to the housing and configured to receive input from the operator based on the requirements for the mobile hydraulic equipment to adjust at least one of the plurality of adjustable parameters on the display and to select one of the plurality of modes of at least one of the plurality of terminals; and
a temperature sensor providing a signal to the processor corresponding to a real-time measurement of an ambient temperature in which the mobile hydraulic equipment is being operated, wherein a portion of the plurality of terminals are configured to provide the plurality of output signals to the mobile hydraulic equipment and wherein the plurality of output signals are compensated by the processor as a function of the ambient temperature.

2. The controller of claim 1 at least one of the plurality of parameters corresponds to each terminal and is adjustable from the user interface to select operation of the corresponding terminal in one of the plurality of modes.

3. The controller of claim 1 wherein the user interface is a plurality of buttons accessible to the operator through at least one opening in the housing.

4. The controller of claim 2 wherein a portion of the terminals are selectively operable in a first mode to receive an analog signal or a second mode to receive a digital signal.

5. The controller of claim 2 wherein a portion of the terminals are selectively operable in a first mode to receive an input signal and selectively operable in a second mode to transmit an output signal.

6. The controller of claim 5 wherein, in the first mode, the terminals are selectively operable to receive one of a digital input and a frequency input and, in the second mode, selectively operable to transmit one of a current compensated output, a pulse width modulated output, and a digital output.

7. The controller of claim 2 wherein a portion of the terminals are configured as paired outputs, wherein only one of the paired outputs may output a signal at a time.

8. A controller configurable to operate different mobile hydraulic equipment according to requirements of different applications, the controller comprising:
a housing, wherein the housing is mounted on the mobile hydraulic equipment;
a receiver mounted at least partly within the housing and configured to wirelessly receive a plurality of transmitted control signals from a remote transmitter;
a processor mounted within the housing and operatively connected to the receiver to receive the control signals and generate a plurality of output signals for operating the mobile hydraulic equipment;
a memory device mounted within the housing and operatively connected to the processor, the memory device storing a plurality of adjustable parameters corresponding to control of the mobile hydraulic equipment, wherein at least one of the plurality of adjustable parameters are set based on the requirements for the mobile hydraulic equipment;
a temperature sensor providing a signal to the processor corresponding to a real-time measurement of an ambient temperature in which the mobile hydraulic equipment is being operated; and
a plurality of terminals operatively connected to the processor and selectively configured to operate in one of a plurality of modes based on the requirements for the mobile hydraulic equipment, wherein a portion of the terminals are configured to provide the plurality of output signals to the mobile hydraulic equipment and wherein the plurality of output signals are compensated as a function of the ambient temperature.

9. The controller of claim 8 wherein a portion of the terminals are selectively operable in a first mode to receive an analog signal or a second mode to receive a digital signal.

10. The controller of claim 8 wherein a portion of the terminals are selectively operable in a first mode to receive an input signal and selectively operable in a second mode to transmit an output signal.

11. The controller of claim 8 wherein a portion of the terminals are configured as paired outputs, wherein only one of the paired outputs may output a signal at a time.

12. The controller of claim 10 further comprising:
a display mounted to the housing and operatively connected to the processor, the display configured to provide a visual indication to an operator of the plurality of adjustable parameters; and a user interface mounted to the housing and configured to receive input from the operator to adjust at least one of the plurality of adjustable parameters on the display.

13. The controller of claim 12 wherein the user interface is a plurality of buttons accessible to the operator through at least one opening in the housing.

14. A controller configurable to operate different mobile hydraulic equipment according to requirements of different applications, the controller comprising:
- a housing, wherein the housing is mounted on the mobile hydraulic equipment;
- a receiver mounted at least partly within the housing and configured to wirelessly receive a plurality of transmitted control signals from a remote transmitter;
- a processor mounted within the housing and operatively connected to the receiver to receive the control signals and generate a plurality of output signals for operating the mobile hydraulic equipment;
- a memory device mounted within the housing and operatively connected to the processor, the memory device storing a plurality of adjustable parameters corresponding to control of the mobile hydraulic equipment;
- a display mounted to the housing and operatively connected to the processor, the display configured to provide a visual indication to an operator of the plurality of adjustable parameters;
- a plurality of buttons accessible to the operator through at least one opening in the housing and configured to receive input from the operator to adjust at least one of the adjustable parameters based on the requirements of the mobile hydraulic equipment;
- a plurality of terminals operatively connected to the processor and selectively configured to operate in one of a plurality of modes based on the requirements of the mobile hydraulic equipment, wherein operation in one of the modes is configured from the plurality of buttons; and
- a temperature sensor providing a signal to the processor corresponding to real-time measurement of an ambient temperature in which the mobile hydraulic equipment is being operated, wherein a portion of the terminals are configured to provide the plurality of output signals to the mobile hydraulic equipment and wherein the plurality of output signals are compensated as a function of the ambient temperature.

15. The controller of claim 14 wherein a portion of the terminals are selectively operable in a first mode to receive an input signal and selectively operable in a second mode to transmit an output signal.

16. The controller of claim 14 wherein a portion of the terminals are configured as paired outputs, wherein only one of the paired outputs may output a signal at a time.

* * * * *